(12) United States Patent  
Lew

(10) Patent No.: US 6,476,581 B2  
(45) Date of Patent: Nov. 5, 2002

(54) METHODS FOR MAKING APPAREL AND SENSOR COVERING WITH ENERGY CONVERTING, STORING AND SUPPLYING CAPABILITIES AND OTHER ELECTRICAL COMPONENTS INTEGRATED THEREIN

(75) Inventor: Ark L. Lew, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/099,035

(22) Filed: Mar. 14, 2002

(65) Prior Publication Data

US 2002/0089304 A1 Jul. 11, 2002

Related U.S. Application Data

(62) Division of application No. 09/080,650, filed on May 18, 1998.

(51) Int. Cl.[7] .............................. H02J 7/00; H02J 1/00; A41D 1/04
(52) U.S. Cl. ......................... 320/107; 320/112; 307/11; 2/102
(58) Field of Search ................................. 320/107, 112; 307/11; 2/69, 102, 93–95; 361/730

(56) References Cited

U.S. PATENT DOCUMENTS

| | | | | | |
|---|---|---|---|---|---|
| 4,954,811 A | * | 9/1990 | Chatigny et al. | ............ | 340/550 |
| 5,644,207 A | * | 7/1997 | Lew et al. | ................... | 320/101 |
| 5,774,338 A | * | 6/1998 | Wessling, III | .............. | 361/730 |
| 5,918,211 A | * | 6/1999 | Sloane | ........................ | 705/16 |
| 5,999,088 A | * | 12/1999 | Sibbitt | ..................... | 340/311.1 |

* cited by examiner

Primary Examiner—Gregory J. Toatley, Jr.
(74) Attorney, Agent, or Firm—Francis A. Cooch

(57) ABSTRACT

Apparel and sensor coverings comprising a material suitable for use therein and a laminate integrated therein, the laminate comprising a plurality of layers comprising an energy conversion means for delivering electrical energy, electrical energy storing means, and charge management and control circuitry. The invention is used to power electronic applications either integrated with the charge management and control circuitry or incorporated into the laminate as a separate layer to create "smart" apparel and sensors. External electronic devices and various types of sensors can be connected and powered using one or more outlets integrated into the material. Antenna(s) and infrared port(s) also integrated into the material permit communications with other wearers of the smart apparel, with and between smart sensors, with local command and control centers on the ground or in the air and with distant headquarters via satellite(s).

17 Claims, 6 Drawing Sheets

METHODS FOR MAKING APPAREL AND SENSOR COVERING WITH ENERGY CONVERTING, STORING AND SUPPLYING CAPABILITIES AND OTHER ELECTRICAL COMPONENTS INTEGRATED THEREIN

CROSS-REFERENCE TO RELATED APPLICATION

This application is a division and claims the benefit of prior filed copending U.S. application Ser. No. 09/080,650, filed May 18, 1998.

BACKGROUND OF THE INVENTION

The invention relates to apparel and sensors having energy sources and electronic applications integrated therein to permit information gathering, processing and transmission.

The requirement for battlefield information and awareness of the battlefield situation is a given. Currently, military personnel are usually outfitted with intelligence gathering, processing and/or transmitting electronic equipment that relies on primary power, that is, batteries of various voltages and sizes.

Most primary battery types are hazardous; some batteries contain very large specific energy densities; some are burdened with memory effects that limit performance; and all have to be disposed. In emergency situations where primary energy sources are depleted, military personnel are at higher risk.

A useful energy source for avoiding many of the above-described problems is the Integrated Power Source (IPS), described and claimed in U.S. Pat. No. 5,644,207. The IPS is self-contained, light weight, portable, modular, malleable and renewable.

What is needed, therefore, are equipment and systems married to renewable energy sources such as the IPS that can gather intelligence, process the data and transmit the information to headquarters in an autonomous, timely, organized and coordinated manner for analysis by the commander and his/her staff.

SUMMARY OF THE INVENTION

The invention comprises apparel and sensor coverings comprising a material suitable for use therein and a laminate integrated therein, the laminate comprising a plurality of layers comprising an energy conversion means for delivering electrical energy, electrical energy storing means, and charge management and control circuitry. The invention is used to power electronic applications integrated with the charge management and control circuitry or incorporated into the laminate as a separate layer to create "smart apparel" and "smart sensors".

External electronic devices and various types of sensors can be connected and powered using one or more outlets integrated into the material. An antenna also integrated into the material permits communications with other wearers of this "smart apparel", with and between "smart sensors", with local command and control centers on the ground or in the air and with distant headquarters via satellite.

A laminate for use in the invention is made by forming layers comprising the energy conversion means for delivering electrical energy, a means for storing electrical energy and charge management and control circuitry. The layers are then laminated together to form the laminate. The laminate is sufficiently flexible that it can be unobtrusively integrated into the material used for making the apparel (and worn as part thereof) or for sensor coverings. The sensor covering can also be comprised solely of the laminate.

Integration of the laminate into the material can be done in any standard manner, e.g., quilt-like, and at any place on the sensor covering or on the apparel, e.g., into the front and/or back of the jacket and/or the sleeve(s), to meet the need of a particular application. The integration can be permanent or designed such that the laminate can be removed to permit the apparel or sensor covering to be cleaned. To disguise the laminate, a thin camouflage cover can be used to cover the energy conversion means, e.g., solar cells, and yet allow the energy from the sun to penetrate and be converted to electricity.

The electrical energy storing means of the invention is, preferably, a secondary, i.e., rechargeable, battery such as a plastic battery and, more specifically, an all polymer battery. A lithium-ion battery, and, if necessary, a primary battery, can also be used in the invention.

Thus, the invention provides for a renewable energy source in combination with electronic applications and devices to permit the kind of data gathering, processing and transmission that implements a true electronic battlefield.

DETAILED DESCRIPTION

The invention comprises apparel and sensor coverings for the electronic battlefield but with potential applications for transportable electronic devices (e.g., computers, audio/video devices, etc.) for use in law enforcement, business and leisure activities. The apparel and sensor coverings comprise a material suitable for use therein and a laminate integrated therein, the laminate comprising a plurality of layers comprising an energy conversion means for delivering electrical energy, electrical energy storing means, and charge management and control circuitry. The invention is used to power electronic applications integrated with the charge management and control circuitry or incorporated into the laminate as a separate layer to create "smart apparel" and "smart sensors".

External electronic devices and various types of sensors can be connected and powered using one or more outlets integrated into the material. An antenna also integrated into the material permits communications with other wearers of this "smart apparel", with and between "smart sensors", with local command and control centers on the ground or in the air and with distant headquarters via satellite.

A laminate for use in the invention is described and claimed in U.S. Pat. No. 5,644,207 which is incorporated herein by reference. In essence, layers are formed comprising the energy conversion means for delivering electrical energy, a means for storing electrical energy and charge management and control circuitry, and the layers are then laminated together to form the laminate. The laminate is sufficiently flexible that it can be unobtrusively integrated into the material used for making the apparel (and worn as part thereof) or for sensor coverings. The sensor covering can also be comprised solely of the laminate.

Integration of the laminate into the material can be done in any standard manner, e.g., quilt-like, and at any place on the sensor covering or on the apparel, e.g., into the front and/or back of the jacket and/or the sleeve(s), to meet the need of a particular application. The integration can be permanent or designed such that the laminate can be removed to permit the apparel or sensor covering to be cleaned. The laminate could also be integrated into a Kevlar material that would provide some protection from projectiles, e.g., bullets and shrapnel. To disguise the laminate, a thin camouflage cover can be used to cover the energy conversion means, e.g., solar cells, and yet allow the energy from the sun to penetrate and be converted to electricity.

The electrical energy storing means of the invention is, preferably, a secondary, i.e., rechargeable, battery such as a plastic battery and, more specifically, an all polymer battery. A lithium-ion battery, and, if necessary, a primary battery, can also be used in the invention.

Figure 1A:
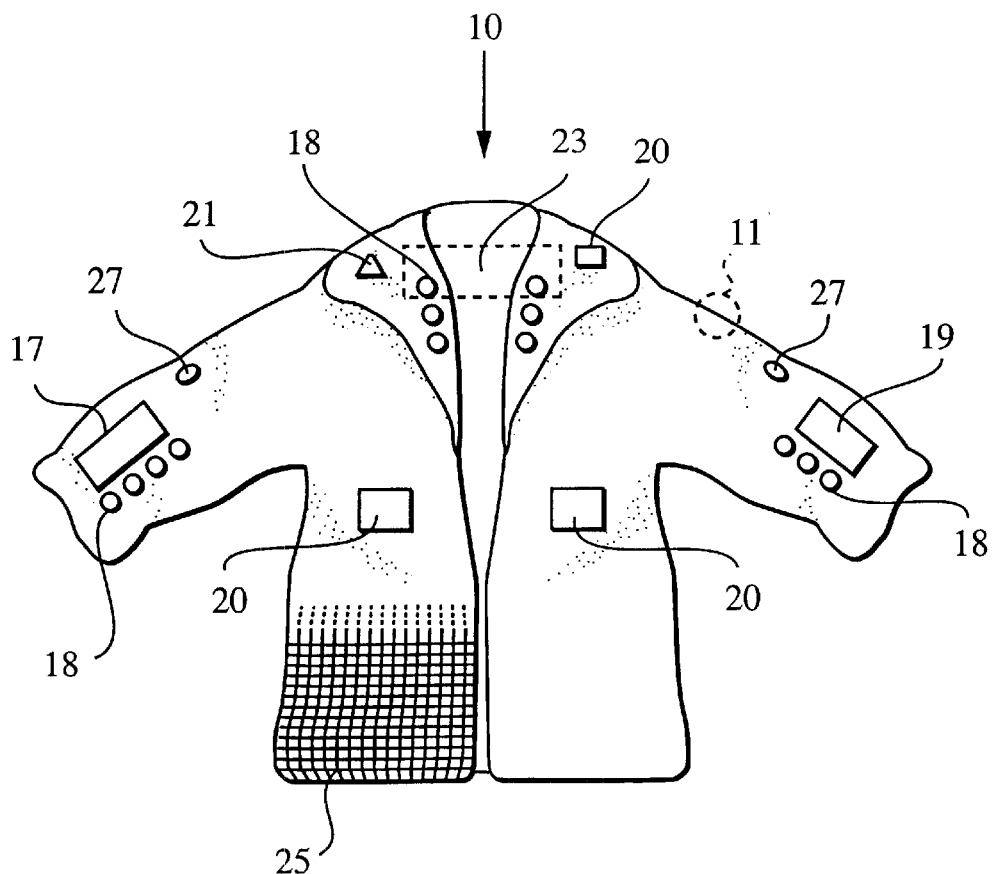
FIGS. 1A and 1B illustrate a "smart jacket", i.e., an example of an apparel embodiment of the invention.
Figure 1B:
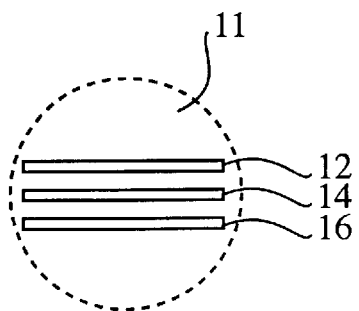

FIG. 1 illustrates one example of the apparel embodiment of the invention called a "smart jacket" 10. As shown in the enlarged section, the material of the jacket (also called IPSAC for Integrated Power Source Applications Cloth) has integrated therein a laminate 11 comprising layers of: a plurality of solar cells 12 as the energy conversion means for delivering electrical energy, a rechargeable battery 14 as the electrical energy storing means and charge management and control circuitry 16. In most cases, one or more electronic applications, e.g., a transmitter circuit (not shown), can be integrated with the charge management and control circuitry and powered by the solar cell/rechargeable battery/charge management and control circuitry combination. Alternatively, the electronic application(s) can comprise their own separate layer which is then incorporated into the laminate.

Continuing with FIG. 1, one or more outlets 18 for connecting and powering transportable and/or hand held external electronic devices can be integrated into the material. These electronic devices would be in addition to the electronic application(s) integrated with the charge management and control circuitry. The outlet(s) would provide the necessary voltages with the proper current drain to power the external electronic devices; this could be accomplished by incorporating the necessary electronics circuitry into the charge management and control circuitry layer. One or more miniature audio transducers, e.g. microphones 21, can be integrated into the lapel/collars and connected to the outlet (s) to capture audio.

Also integrated on the material are a status patch 17 and a command or input patch 19. The status patch can comprise a flexible LCD display to output data and information to the wearer. The command patch contains a flexible keypad type of input entry to the electronics integrated in the apparel.

An RF antenna 23 as well as infrared port(s) 20 for the reception and transmission of data can also be integrated into the material. Integrated antenna are configured to receive dumps from distributed "smart sensors" (discussed below) and signals from Global Positioning System (GPS) satellites for position location, and to support other RF transmission. RF communications are designed for intra- and inter-unit communication and for transmission of information back to command headquarters directly or via relays. The IR ports would implement the transmission of information between the "smart jacket" and the "smart helmet" (discussed below).

For military applications, "smart apparel" can integrate remote and internal (wearer's physiological functions) sensing, data collection, data processing, data fusion and subsequent wireless transmission of the fused data to a central terminal or other location. One example would be the use of the "smart jacket" to support military personnel acting as scouts in an advance party.

A penetration detector 25 (partially shown in FIG. 1 and indicated in FIG. 6), i.e., a material for sensing penetration of projectiles such as bullets, shrapnel or other objects, can also be integrated throughout the material of the apparel, e.g., smart jacket. The penetrator material would be thin and could comprise an x-y grid layer of fine conductive wire or optic fibers connected to the electronics in the laminate. The penetrator material would sense discontinuities caused by bullets and/or shrapnel entering and blood leaving the soldier's body and that information could then be communicated to others for a determination as to the seriousness of the injury.

Vibration transducers 27 (see FIGS. 1 and 6) to signal the soldier can be located at various points on the apparel and connected to the electronics in the laminate. In a simple form of code, activation of a particular transducer could send a specific message to the soldier depending on where he or she feels the vibration.

Figure 2A:
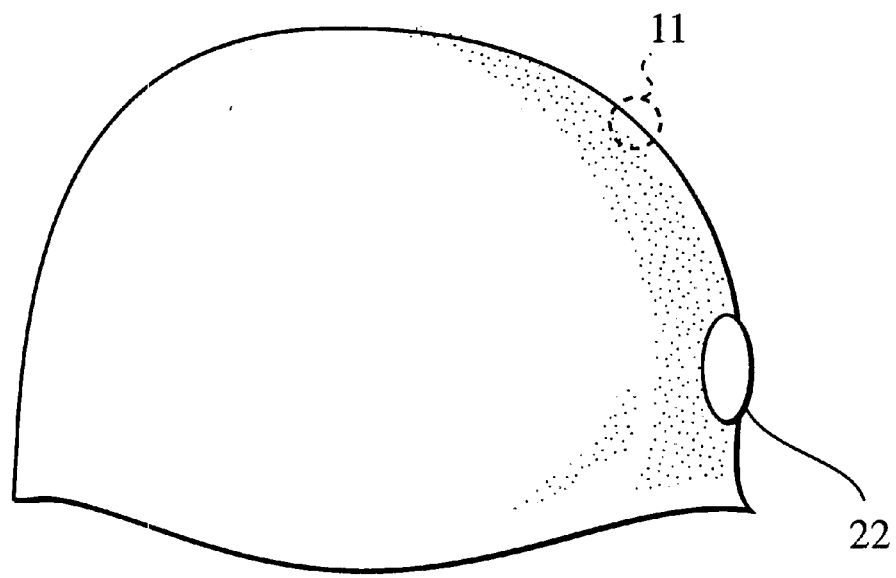
FIGS. 2A and 2B illustrate another example of the apparel embodiment of the invention in the form of a helmet, with a camera lens integrated therein, for image acquisition, data storage and transmission.
Figure 2B:
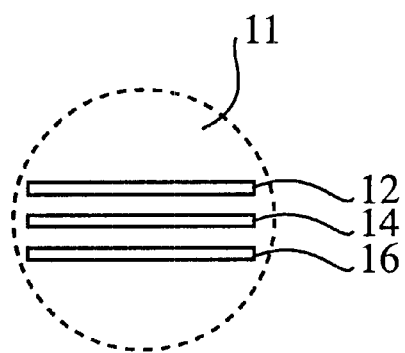

Another example of a military application is the headgear, i.e., helmet, shown in FIG. 2. In this embodiment, the laminate 11 has been integrated into the material covering a helmet and is connected via an outlet (not shown) to a camera lens 22 for image acquisition. The electronic applications for storage and transmission of the image data can be integrated into the charge management and control circuitry 16.

Besides jackets and headgear, the apparel that can form the invention is only limited by the imagination and the application but can include pants, shirts, vests, belts, hats and shoes. The "smart apparel" will reduce the load for the wearer with the integration of electronic applications and devices that are now manually manipulated and can, therefore, enable an enhanced mobility for all types of operating scenarios.

Figure 3A:
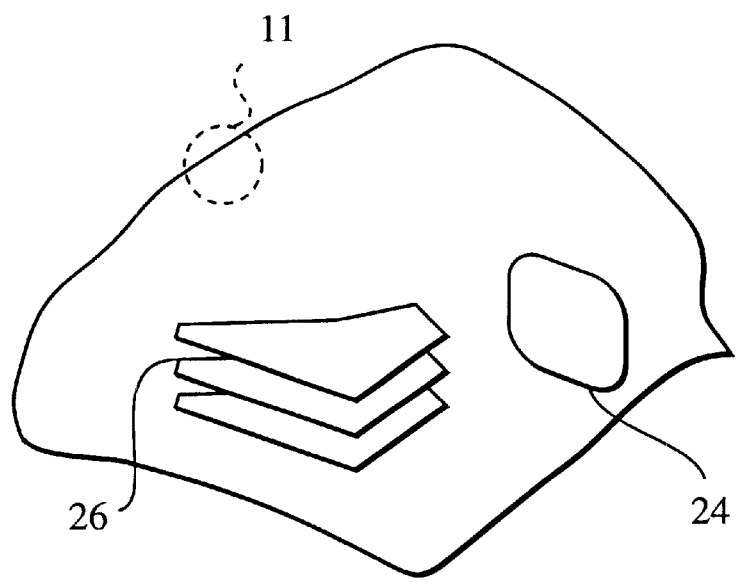
FIGS. 3A and 3B illustrate a "smart rock", i.e., an example of a sensor covering embodiment of the invention. sensor covering embodiment of the invention.
Figure 3B:
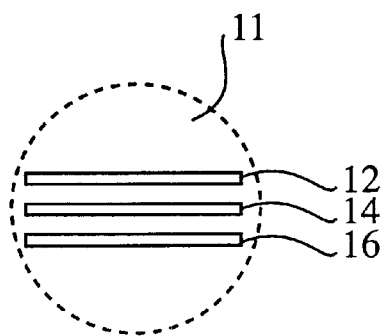

As noted, the invention also comprises sensor coverings comprising a suitable material and the laminate integrated therein. Alternatively, in some applications, the laminate itself will comprise the sensor housing. An example of such a sensor covering is the "smart rock" shown in FIG. 3. As with the jacket in FIG. 1, as shown in the enlarged section, the material of the sensor covering has the laminate 11 integrated therein, the laminate comprising layers of: solar cells 12, a rechargeable battery 14 and charge management and control circuitry 16 with electronic applications integrated therein. The "smart rock" also contains a sensor 24 that can be chemical, optical and/or mechanical and additional electronics 26, as necessary.

Such "smart sensors", either individually or collectively (in the form of a monitoring station), could sample environmental parameters and conditions (temperature, motion, humidity, cloud cover, precipitation, images of all spectral types, etc.). In a military context, camouflaged smart sensors/monitoring stations could be placed in desired locations to monitor not only environmental conditions but motion of personnel and equipment (using vibration energy from the ground) for collection in a surreptitious manner for subsequent transmission to, e.g. a central processing terminal/station. In addition to rocks, these sensors/monitoring stations could be configured and camouflaged as plants, fallen tree branches or other objects that blend in with the environment. Due to the use of solar cells and rechargeable batteries, these "invisible" sensors/monitoring stations could be placed in strategic locations to gather tactical information on a long term, continuing basis.

Figure 4A:
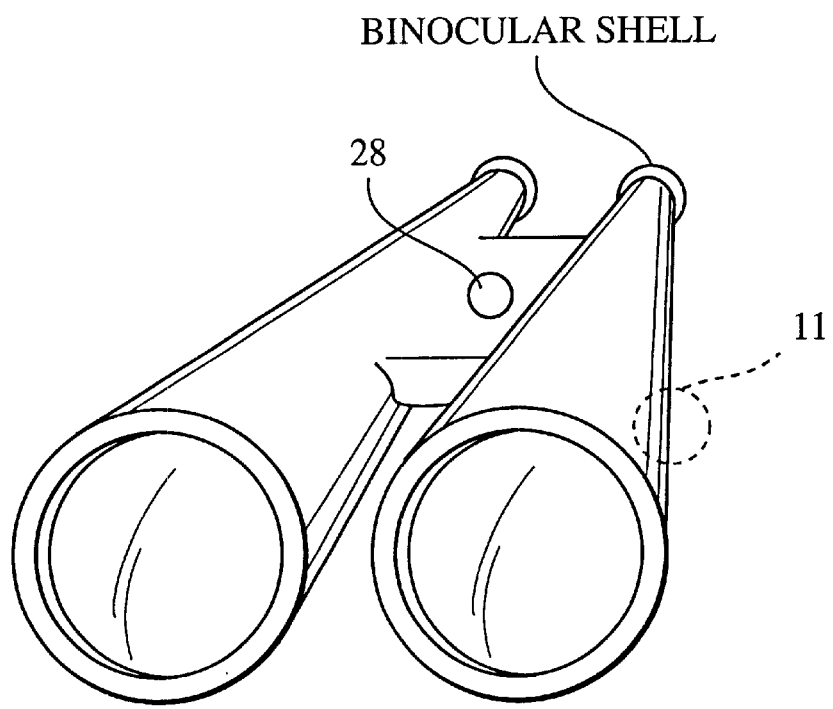
Figure 4B:
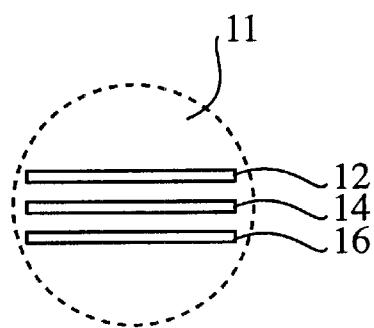

A hand held type of "smart sensor" is shown in FIG. 4. Here the sensor covering is a shell for a pair of binoculars with image capturing electronics (e.g., ccd) 28. Military personnel, using the "smart binoculars", can scan the field of concern and capture a desired image. The captured image can then be stored in a data storage electronic application integrated within the shell of the binoculars with a push of a button. Another button on the binoculars could operate integrated data transmission electronics to transmit the image to a smart jacket or a central terminal, via either infrared or RF energy. This is a very effective source of high data compression since the evaluation is being performed by personnel; and, only scenes with high information contents would be captured and transmitted back to the commanders.

Figure 5:
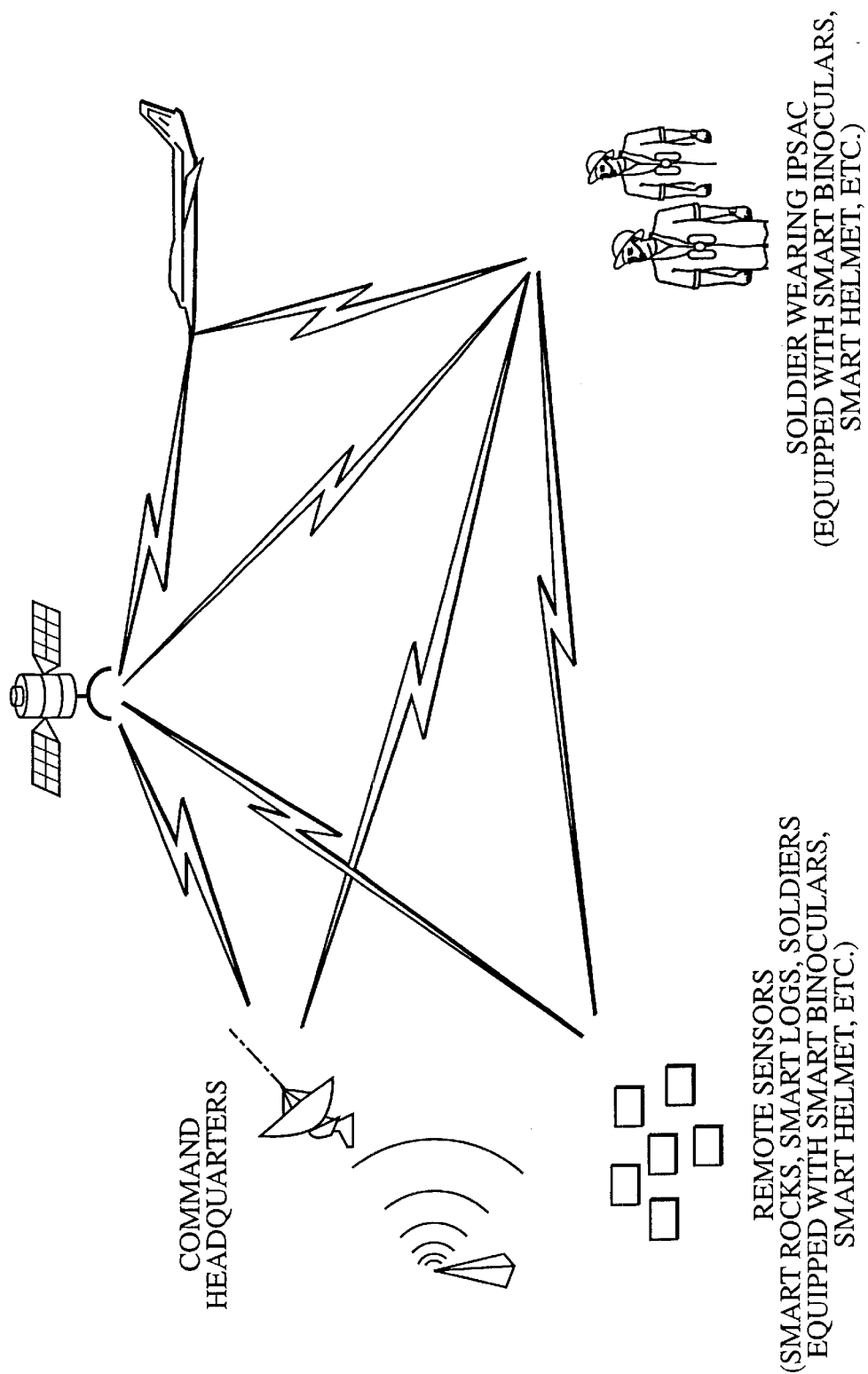
FIG. 5 is a schematic of a "smart" electronic battlefield that utilizes "smart apparel" and "smart sensors" for information gathering, processing and transmission.

Once data has been gathered by the "smart apparel" and "smart sensors" of the invention, the data can be transmitted via either an RF or infrared link for collection, processing and, if necessary, retransmission. FIG. 5 shows a "smart battlefield" in which information gathered by "smart sensors" can be transmitted to soldiers wearing "smart apparel" where it is received and processed by the electronic applications integrated into the laminate or by electronic devices connected via the integrated outlets and then retransmitted to a local central terminal station or directly to command headquarters or elsewhere for assessment and appropriate action. In conditions where it is impractical to have local central terminal station(s) to receive the transmissions from the "smart jackets" or sensors/monitoring stations, the information can be transmitted to an airplane or a constellation of small relay satellites for retransmission to headquarters.

Figure 6:
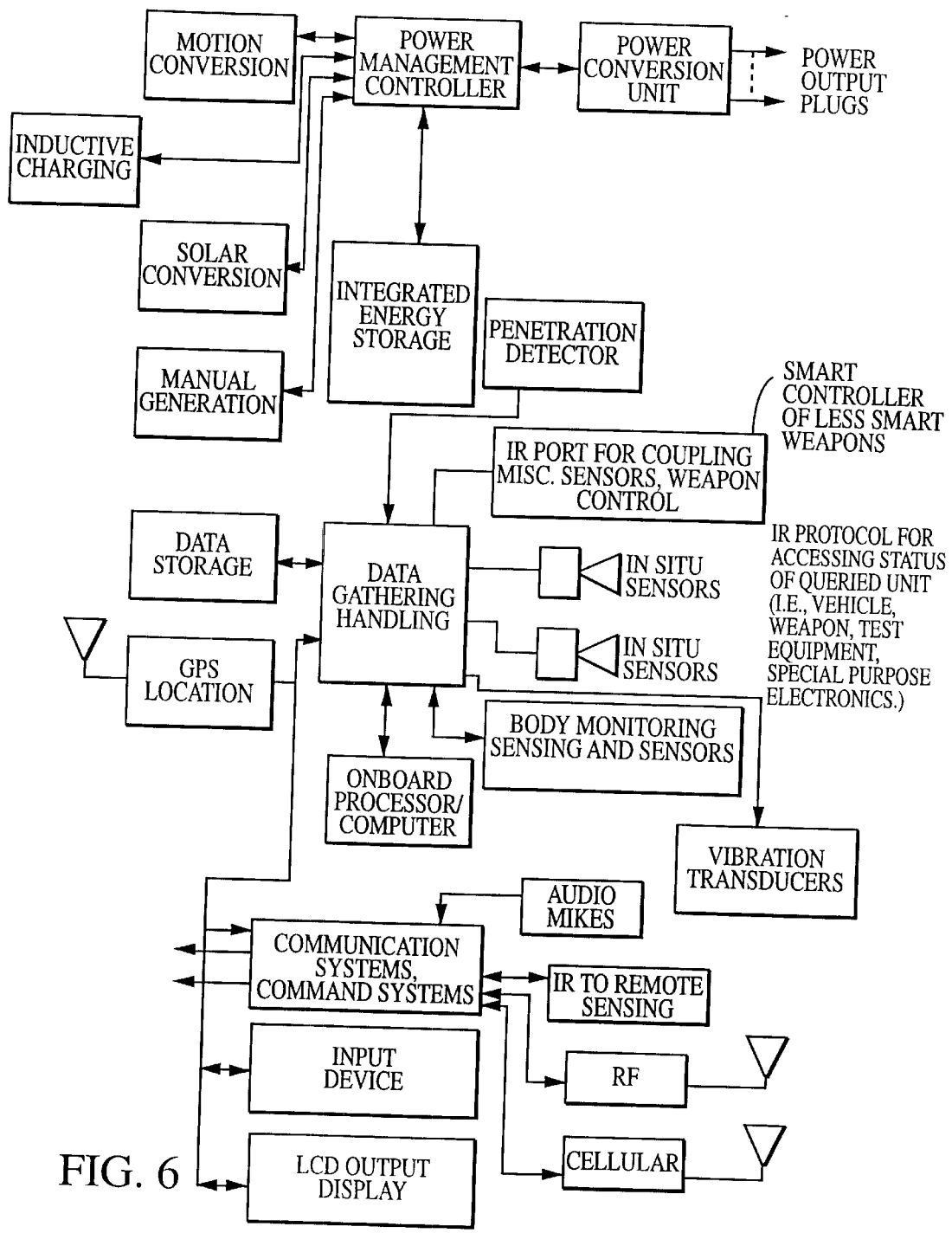
FIG. 6 is a block diagram of the information gathering, processing and transmission capabilities of "smart apparel" in the context of the "smart" electronic battlefield.

FIG. 6 illustrates, in block diagram form, the "smart battlefield" from the viewpoint of military personnel wearing "smart apparel." The potential for data gathering, processing and transmission is highlighted by the numerous input and output devices shown.

The electronic battlefield as described above will provide unprecedented visibility and awareness of the battlefield situation via a network of distributed autonomous "smart sensors" and ground based personnel wearing "smart apparel" with electronics systems integrated therein, all networked in a fashion to provide fused data to permit an army to perceive, communicate and act in manner necessary to accomplish its mission.

I claim:

1. A method for fabricating apparel with energy converting, storing and supplying capabilities integrated therein, the method comprising the steps of:
    making the apparel using a suitable material;
    forming layers comprising an energy conversion means for delivering electrical energy, a means for storing electrical energy and charge management and control circuitry;
    laminating together the energy conversion means, electrical energy storing means and charge management and control circuitry layers to form a laminate; and
    integrating the laminate into the material.

2. The method as recited in claim 1, further comprising the step of integrating an electronic application with the charge management and control circuitry.

3. The method as recited in claim 1, further comprising the step of forming a layer comprising an electronic application for inclusion in the laminate.

4. The method as recited in claim 1, further comprising the step of integrating an outlet for connecting and powering an external electronic device into the material.

5. The method as recited in claim 2 or 4, further comprising the step of integrating an antenna into the material.

6. The method as recited in claim 5, wherein the electrical energy storing means comprises a rechargeable battery.

7. The method as recited in claim 6, wherein the energy conversion means comprises a plurality of solar cells.

8. A method for fabricating apparel with energy converting, storing and supplying capabilities integrated therein, the method comprising the steps of:
    making the apparel using a suitable material;
    forming layers comprising an energy conversion means for delivering electrical energy, a means for storing electrical energy, charge management and control circuitry and an electronic application;
    laminating together the energy conversion means, electrical energy storing means, charge management and control circuitry and electronic application layers to form a laminate;
    integrating the laminate into the material;
    integrating an outlet for connecting and powering an external electronic device into the material; and
    integrating an antenna into the material.

9. A method for making an outer covering for a sensor, the covering having energy converting, storing and supplying capabilities integrated therein, the method comprising the steps of:
    making the covering using a suitable material;
    forming layers comprising an energy conversion means for delivering electrical energy, a means for storing electrical energy and charge management and control circuitry;
    laminating together the energy conversion means, electrical energy storing means and charge management and control circuitry layers to form a laminate; and
    integrating the laminate into the material.

10. The method as recited in claim 9, further comprising the steps of integrating an electronic application with the charge management and control circuitry.

11. The method as recited in claim 9, further comprising the step of forming a layer comprising an electronic application for inclusion in the laminate.

12. The method as recited in claim 10 or 11, wherein the covering comprises solely the laminate.

13. The method as recited in claim 9, further comprising the step of integrating an outlet for connecting and powering an external electronic device into the material.

14. The method as recited in claim 10 or 13, further comprising the step of integrating an antenna into the material.

15. The method as recited in claim 14, wherein the electrical energy storing means comprises a rechargeable battery.

16. The method as recited in claim 15, wherein the energy conversion means comprises a plurality of solar cells.

17. A method for making an outer covering for a sensor, the outer covering having energy converting, storing and supplying capabilities integrated therein, the method comprising the steps of:

making the covering using a suitable material;

forming layers comprising an energy conversion means for delivering electrical energy, a means for storing electrical energy, charge management and control circuitry and an electronic application;

laminating together the energy conversion means, electrical energy storing means, charge management and control circuitry and electronic application layers to form a laminate;

integrating the laminate into the material;

integrating an outlet for connecting and powering an external electronic device into the material; and integrating an antenna into the material.

* * * * *